United States Patent Office 2,819,148
Patented Jan. 7, 1958

2,819,148

PURIFICATION OF TITANIUM TETRACHLORIDE

Gerhard Barth-Wehrenalp, Elkins Park, Pa., assignor to Pennsalt Chemicals Corporation, a corporation of Pennsylvania No Drawing. Application July 5, 1955
Serial No. 520,105

9 Claims. (Cl. 23—87)

This invention relates to the purification of titanium tetrachloride and more particularly to the separation of titanium tetrachloride from the chlorides of phosphorus.

In co-pending application Serial No. 520,107, filed July 5, 1955, the preparation of phosphorus trichloride through the chlorination of ferrophosphorus is described. Ferrophosphorus, a by-product of the phosphate industry, contains impurities, among which titanium is usually present in amounts of about 1.5%. As a result of the process described in said application, titanium tetrachloride is formed and distilled as a contaminant, together with phosphorus trichloride, when ferrophosphorus is chlorinated, and then heated with unchlorinated ferrophosphorus.

The presence of the titanium tetrachloride apparently sensitizes phosphorus trichloride to oxidation by atmospheric oxygen forming phosphorus oxychloride. This phosphorus oxychloride then combines with the titanium tetrachloride present to form stable, high boiling compounds, having the general formula $TiCl_4 \cdot (POCl_3)_n$ where $n$ is equal to or greater than 1, and generally is 1 to 2. The unreacted phosphorus trichloride may be readily purified by distilling it away from the titanium tetrachloride-phosphorus oxychloride compounds and other impurities that may be present. However, the titanium tetrachloride-phosphorus oxychloride compounds tie up substantial amounts of the phosphorus and may cause losses in phosphorus recovery of as much as 12%.

Prior to the present invention, no method had been found, either to recover this phosphorus, or to separate the titanium tetrachloride, which is itself a commercially valuable chemical.

It has now been discovered that titanium tetrachloride may be separated from the phosphorus chlorides in substantially pure form, by first separating through fractional distillation, the phosphorus trichloride from the titanium tetrachloride-phosphorus oxychloride complex, and then separating the titanium tetrachloride and the phosphorus oxychloride through utilization of a previously unknown group of reactions of compounds of titanium, iron and phosphorus chlorides.

In the practice of this invention, the titanium tetrachloride-phosphorus oxychloride compounds are reacted with phosphorus pentachloride, which replaces the oxychloride in the compounds to form similar compounds having the general formula $TiCl_4 \cdot (PCl_5)_n$ where $n$ is greater than or equal to 1, and generally is 1 to 2. After removal of phosphorus oxychloride by distillation, the residue, consisting of the titanium tetrachloride-phosphorus pentachloride compound, is made to react with ferric chloride, which replaces the titanium tetrachloride, releasing it so that it may be distilled. The ferric chloride forms a stable, high boiling complex with phosphorus pentachloride, having the approximate formula $(FeCl_3)_2 \cdot PCl_5$. This complex, which is a eutectic in the system $FeCl_3—PCl_5$ at 33 mole percentage $PCl_5$, is capable of dissolving small amounts of ferric chloride or phosphorus pentachloride without appreciably lowering the boiling point.

The reactions are believed to proceed in accordance with the following equations:

(1) $TiCl_4 \cdot (POCl_3)_n + nPCl_5 \rightarrow TiCl_4 \cdot (PCl_5)_n + nPOCl_3$ (2) $TiCl_4 \cdot (PCl_5)_n + 2nFeCl_3 \rightarrow n(FeCl_3)_2 \cdot PCl_5 + TiCl_4$ in which $n$ is greater than or equal to 1, and usually is 1 to 2.

The titanium tetrachloride-phosphorus oxychloride material generally consists of a mixture of the compounds $TiCl_4 \cdot POCl_3$ and $TiCl_4 \cdot 2POCl_3$; however, a mixture in which these compounds are dissolved in excess phosphorus oxychloride may occur, and the present invention is equally suitable for separating the titanium tetrachloride from such mixtures.

In practicing the invention the titanium tetrachloride-phosphorus oxychloride material is placed in a suitable reaction vessel, equipped with an outlet for recovery of volatile products, and heated to a temperature of about 85° to 140° C., at which temperatures it is a liquid. Phosphorus pentachloride is then admixed with the material in the reaction vessel. This may be done either by adding phosphorus pentachloride directly or by adding phosphorus trichloride and gaseous chlorine, these being essentially equivalent for the purpose of practicing the present invention. In order to effect the complete removal of the phosphorus oxychloride, there must be added sufficient phosphorus pentachloride to provide at least one mole phosphorus pentachloride for each mol of phosphorus oxychloride present. The amount of phosphorus oxychloride present can be determined by analysis, so that an exactly equimolar amount of phosphorus pentachloride may be added; however, this has not been found to be necessary, since a slight excess of phosphorus pentachloride over the molecularly equivalent amount works equally well, and has no detrimental effect on the process.

On the inclusion of the phosphorus pentachloride, a slightly exothermic reaction occurs, in which it is believed that the phosphorus pentachloride replaces phosphorus oxychloride to form a mixture of the compounds $TiCl_4 \cdot PCl_5$ and $TiCl_4 \cdot 2PCl_5$ as illustrated by the foregoing Equation 1. If an excess of phosphorus pentachloride has been used, the amount in excess of that needed to replace the phosphorus oxychloride will also be admixed with these compounds. These compounds are solids at the reaction temperature, and precipitate out in the liquid reaction mass.

By raising the temperature to about 107° to 239° C., substantially all the phosphorus oxychloride present in the reaction mixture is removed by distillation and may be condensed and collected by conventional means. The temperature should preferably not exceed about 140° C. until the reaction is substantially complete, in order to prevent possible volatilization of any unreacted titanium tetrachloride-phosphorus oxychloride. It is generally desirable to remove the last traces of phosphorus oxychloride, after the reaction is complete, by heating to temperatures higher than 140° C., but not exceeding 239° C.

To the phosphorus pentachloride-titanium tetrachloride compounds, remaining as solids in the reaction vessel is added solid anhydrous ferric chloride. This may be added without mixing so that the phosphorus pentachloride-titanium tetrachloride composition is substantially covered with solid, anhydrous ferric chloride. The amount of ferric chloride added should be sufficient to provide approximately two mols ferric chloride for each mol phosphorus pentachloride present; however, attainment of the exact molecular equivalency is not critical, and an approximation, which may provide either slightly more or less ferric chloride, is equally suitable. The reason for this is that the ferric chloride-phosphorus pentachloride complex formed in the ensuing reaction is capable of dissolving small amounts of either ferric chloride or phosphorus pentachloride.

At the reaction temperature of 100° to 239° C., a reaction takes place apparently at the solid interface, with formation of a liquid complex having the approximate formula $(FeCl_3)_2 \cdot PCl_5$. The titanium tetrachloride, which is volatile at these temperatures, is released, and will distill free of the complex at temperatures of 136° to 486° C. In a manner similar to that described in the previous reaction, it is preferred to maintain the reaction temperature below 239° C. until the reaction is substantially complete, to prevent the titanium tetrachloride-phosphorus pentachloride from subliming, and then to heat the mixture to substantially higher temperatures but not exceeding 486° C., to remove the last traces of titanium tetrachloride.

The following example will help to illustrate the practice of the invention:

After removal of the phosphorus trichloride prepared from the chlorination of ferrophosphorus, as described in co-pending application Serial No. 520,107, cited above, the crude phosphorus trichloride was passed directly into a distillation column wherein it was separated out from the titanium tetrachloride. The titanium tetrachloride remained in the form of the complex $TiCl_4 \cdot POCl_3)_n$, this complex being the residue boiling higher than 76° C.

To 129 parts by weight of the liquid titanium tetrachloride-phosphorus oxychloride compound in a distillation vessel was then added 82 parts by weight of solid phosphorus pentachloride.

At a temperature of about 110° C., an exothermic reaction took place, with precipitation of solid titanium tetrachloride-phosphorus pentachloride compounds and vaporization of pure phosphorus oxychloride. The temperature was raised to 120° C. in order to boil off all the phosphorus oxychloride, which was collected and condensed. 54 parts by weight of phosphorus oxychloride were obtained, corresponding to 94% of theoretical yield.

To the solid residue, consisting of 157 parts by weight, was added 128 parts by weight of solid anhydrous ferric chloride at a temperature of 120° C. The temperature was raised to over 136° C., and pure titanium tetrachloride was distilled off. From this, 60 parts by weight of titanium tetrachloride, corresponding to 81% of theoretical yield were obtained and 221 parts by weight of the liquid remained in the vessel. This residue was $(FeCl_3)_2 \cdot PCl_5$.

It is a characteristic of the process of this invention, that the limiting conditions for its successful practice are predetermined by the physical properties of the compounds themselves. Thus, the volatilization temperatures of the compounds involved determine the temperature range within which any given reaction must be carried out. Also, in the two previously unknown reactions, i. e., the replacement of phosphorus oxychloride compounds by phosphorus pentachloride, and the replacement of titanium tetrachloride in the titanium tetrachloride-phosphorus pentachloride compounds by ferric chloride, the amount of the reagent needed in any given reaction is determined by the amount of the compound to be replaced.

In the specification and in the claims the present invention is described as being carried out at atmospheric pressure. As with most chemical reactions, pressures greater or less than atmospheric pressure may be used. If pressures substantially below or above atmospheric pressure are employed it is apparent that the temperature limitations will vary somewhat as would be expected, the temperatures being slightly lower for reduced pressures and slightly higher for higher pressures. Any such variations are intended to be included in the present specification and claims.

Having thus described my invention I claim:

1. In the separation of titanium tetrachloride and phosphorus oxychloride from titanium tetrachloride and phosphorus oxychloride complex mixtures, the method comprising reacting phosphorus pentachloride with said complex at a temperature of 85° to 140° C. to form a titanium tetrachloride-phosphorus pentachloride complex and free phosphorus oxychloride, removing said free phosphorus oxychloride, reacting ferric chloride with said titanium tetrachloride-phosphorus pentachloride complex at a temperature of 100° to 239° C. to form a ferric chloride-phosphorus pentachloride complex and free titanium tetrachloride and removing said free titanium tetrachloride.

2. The method of claim 1 wherein the phosphorus pentachloride is formed in situ by adding phosphorus trichloride and chlorine to said titanium chloride-phosphorus oxychloride mixture.

3. The method of claim 1 wherein the phosphorus pentachloride is reacted with the titanium tetrachloride-phosphorus oxychloride complex mixtures in amounts substantially the molar equivalent of the phosphorus oxychloride in said complex and the ferric chloride is reacted with said titanium tetrachloride-phosphorus pentachloride complex in molar equivalent amounts of substantially 2 mols of ferric chloride per mol of phosphorus pentachloride present in said titanium tetrachloride-phosphorus pentachloride complex mixture.

4. In the separation of titanium tetrachloride and phosphorus oxychloride from titanium tetrachloride-phosphorus oxychloride complex mixtures, the method comprising reacting phosphorus pentachloride with said complex mixture in molar equivalents of substantially 1 mol phosphorus pentachloride per mol phosphorus oxychloride present in said complex at a temperature of 85° to 140° C., after said reaction is substantially completed maintaining said temperature within the range of 107° to 239° C. until substantially all of the phosphorus oxychloride has been removed, reacting ferric chloride with the residue which is a complex of titanium tetrachloride-phosphorus pentachloride, at a temperature of 100° to 239° C. to form a ferric chloride-phosphorus pentachloride complex and free titanium tetrachloride, and then maintaining the reaction mixture at a temperature within the range of 136° to 486° C. to distill off the free titanium tetrachloride formed.

5. The process of claim 4 wherein the titanium tetrachloride-phosphorus pentachloride complex formed through the reaction of phosphorus pentachloride with the titanium tetrachloride-phosphorus oxychloride complex is heated at a temperature of between 140° to 239° C. to distill off any phosphorus oxychloride that may still be present.

6. The method of separating phosphorus oxychloride from a complex containing titanium tetrachloride and phosphorus oxychloride comprising reacting said complex at a temperature of 85° to 140° C. with phosphorus pentachloride, and distilling said phosphorus oxychloride from the reaction mixture.

7. The method of claim 6 wherein at least one mole of said phosphorus pentachloride is present for each mole of said phosphorus oxychloride in said complex.

8. The method of separating titanium tetrachloride from a complex containing titanium tetrachloride and phosphorus pentachloride comprising reacting said complex with ferric chloride at a temperature of 100 to 235° C., and distilling said titanium tetrachloride from the reaction mixture.

9. The method of claim 8 wherein at least 2 moles of said ferric chloride is present for each mole of said titanium tetrachloride in said complex.

References Cited in the file of this patent

J. W. Mellor's "A Comprehensive Treatise on Inorganic and Theoretical Chem.," vol. 7, 1927 ed., page 85, Longmans, Green & Co., New York.